US006469454B1

(12) United States Patent
Mader et al.

(10) Patent No.: US 6,469,454 B1
(45) Date of Patent: Oct. 22, 2002

(54) COLD CATHODE FLUORESCENT LAMP CONTROLLER

(75) Inventors: Urs Mader, Sunnyvale; Henry Chu, Cupertino; Roger Chen, Woodside, all of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 5 days.

(21) Appl. No.: 09/604,611

(22) Filed: Jun. 27, 2000

(51) Int. Cl.[7] .............................................. H05B 41/36

(52) U.S. Cl. ................... 315/291; 315/307; 315/DIG. 4

(58) Field of Search .............................. 315/307, 291, 315/224, DIG. 4, 209 R, 219; 363/22, 23, 25, 133

(56) References Cited

U.S. PATENT DOCUMENTS

| | | | | |
|---|---|---|---|---|
| 5,055,767 A | | 10/1991 | Nelson | 323/285 |
| 5,272,327 A | * | 12/1993 | Mitchell et al. | 250/205 |
| 5,652,479 A | | 7/1997 | LoCascio et al. | 315/225 |
| 5,754,012 A | * | 5/1998 | LoCascio et al. | 315/307 |
| 5,818,669 A | | 10/1998 | Mader | 361/18 |
| 5,844,378 A | | 12/1998 | LoCascio et al. | 315/307 |
| 5,896,015 A | | 4/1999 | Mader | 315/291 |
| 5,923,129 A | * | 7/1999 | Henry | 315/307 |
| 5,965,989 A | | 10/1999 | Mader | 315/279 |
| 6,114,814 A | | 9/2000 | Shannon et al. | 315/219 |
| 6,215,680 B1 | * | 4/2001 | Rolston | 363/133 |

FOREIGN PATENT DOCUMENTS

| | | |
|---|---|---|
| EP | 0 259 603 A1 | 3/1988 |
| UA | 2 314 430 A | 12/1997 |

OTHER PUBLICATIONS

Calderoni, L. et al., "Optimal Feed–Forward Compensation For PWM DC/DC Converters", IEEE Power Electronics Specialists Conference, Jun. 1990, pp. 235–241.
Unitrode Integrated Ciruits UC1871 UC2871 UC3871 Data Sheet, Resonant Fluorescent Lamp Driver, Oct. 1994.
Micro Linear Corporation ML4877 Data Sheet, LCD Desktop Backlight Lamp Driver, Oct. 1998.
Unitrode Products UCC1972/3 UCC2972/3 UCC 3972/3 Data Sheet, BiCMOS Cold Cathode Fluorescent Lamp Driver Controller, Oct. 1998.
Unitrode UC1872 UC2872 UC3872 Data Sheet, Resonant Lamp Ballast Controller, Jul. 1999.
Donahue, Joel A. et al., "The LCC Inverter as a Cold Cathode Fluorescent Lamp Driver", Proceedings of the Annual Applied Power Electronics Conference and Exposition (APEC), Feb. 13, 1994, pp. 427–433.
Linear Technology Corporation, LT1186F Data Sheet, "DAC Programmable CCFL Switching Regulator", 1995, pp. 1–16.
Nalbant, Mehmet K., "A New CCFL Inverter Circuit For AMLCD Panels Resulting In Significantly Higher Efficiency And Brightness", AMLCDS '95 Second International Workshop, Sep. 25, 1995, pp. 133–136.

(List continued on next page.)

Primary Examiner—Haissa Philogene
Assistant Examiner—Ephrem Alemu
(74) Attorney, Agent, or Firm—Blakely, Sokoloff, Taylor & Zafman LLP (57) ABSTRACT

A closed-loop control of the transformer voltage in a Royer inverter for cold cathode fluorescent lamps to provide a wide dimming range capability, such as by way of example, an approximately 100:1 dimming range. This dimming range is achieved by a combination of current control and pulse control to provide a much wider dimming range than can be achieved by using either form of control alone. Various additional features and capabilities of the invention are also described.

46 Claims, 1 Drawing Sheet

OTHER PUBLICATIONS

Fairchild Semiconductor Corporation, Application Note 42010, "Theory and Application of the ML4874 and ML4876 LCD Backlight Controller ICs", Jun. 1996, pp. 1–12.

Redl, Richard et al., A Low–Cost Control IC for Single–Transistor ZVS Cold–Cathode Fluorescent Lamp Intervers and DC/DC Converters, Proceeding of the Applied Power Electronics Conference and Exposition (APEC), Feb. 23, 1997, pp. 1042–1049.

Lin, Mu–Shen et al., "A Cold–Cathode Fluorescent Lamp Driver Circuit with Synchronous Primary–Side Dimming Control", IEEE Transactions on Industrial Electronics, vol. 45, No. 2, Apr. 1, 1998, pp. 249–255.

* cited by examiner

FIG. 1

COLD CATHODE FLUORESCENT LAMP CONTROLLER

BACKGROUND OF THE INVENTION

1. Field of the Invention

The present invention relates to the field of cold cathode fluorescent lamp dimming controllers.

2. Prior Art

Cold cathode fluorescent lamps are now commonly used for backlighting in notebook and laptop computers, car navigation displays, LCD monitors, point of sale terminals and portable medical equipment. In these various applications, it is generally desired to provide a dimming capability for the fluorescent lamp to provide suitable contrast under any of the varied lighting conditions that may be expected to be encountered. In the case of battery powered devices such as notebook and laptop computers, dimming has the added advantage of reducing power consumption, extending the operation of the computer before a battery recharge is required.

The dimming of fluorescent lamps presents special problems not found in incandescent lamps. By way of example, incandescent lamps may be dimmed by merely reducing the voltage applied to the lamp. In the case of incandescent lamps however, for DC operation, fluorescent lamps have an operating voltage that is not a strong function of the lamp current. Consequently, reducing lamp voltage as a primary control will simply allow the lamp to go out. Dimming can be achieved, however, by powering the fluorescent lamp with alternating power through an appropriate load or ballast device, such as an inductor, and controlling the current through the inductor and the fluorescent lamp for dimming purposes. This works well over a reasonable dimming range, and accordingly, is one of the fluorescent lamp control techniques commonly used. However, such analog dimming has a practical limit of 5:1 to 10:1 due to the thermometer effect. The thermometer effect causes the high voltage end of the tube to be significantly brighter than the low voltage end of the tube at low brightness. The tubes also have a tendency to go out and to flicker at low lamp currents.

Another technique for controlling the brightness of a fluorescent lamp is to allow the lamp to go out and periodically re-ignite the same. In that regard, a cold cathode fluorescent lamp requires a relatively high voltage for the initial breakdown and ionization of the gas in the lamp, after which the ionization will be sustained with a lower lamp operating voltage. Allowing the lamp to go out periodically (stop fluorescing), will require repeated restarting of the lamp, requiring a higher starting voltage dependent upon how long the lamp is allowed to be off. Still, periodic restarting of the lamp is not particularly difficult, and accordingly, lamp intensity can be controlled by periodically pulsing the lamp on. This low frequency chop-mode dimming is done by duty-cycle modulating the tube current at low frequency. Widest dimming range is achievable by lowering the frequency of the duty-cycle modulation and by minimizing the shortest reproducible "on" pulse. However the frequency cannot be lower than 100 Hz because of the human eye's perception of flicker. Also the duration of the shortest "on" pulse is limited by how fast the system's regulation loop can settle to create a reproducible pulse of light on the bulb. For a fast loop, the shortest "on" pulse is about 1 ms to 500 µs. This limits the dimming range of chop-mode dimming from 10:1 to 20:1.

BRIEF SUMMARY OF THE INVENTION

The present invention provides a closed-loop control of the transformer voltage in a Royer inverter for cold cathode fluorescent lamps to provide a wide dimming range capability, such as by way of example, an approximately 100:1 dimming range. This dimming range is achieved by a combination of current control and pulse control to provide a much wider dimming range than can be achieved by using either form of control alone. Other features and capabilities of the invention are also described.

DETAILED DESCRIPTION OF THE PREFERRED EMBODIMENT

The present invention provides a closed-loop control of the transformer voltage in a Royer inverter for cold cathode fluorescent lamps to provide a wide dimming range capability, such as by way of example, an approximately 100:1 dimming range. As will be seen from the subsequent description, this dimming range is achieved by a combination of current control and pulse control to provide a much wider dimming range than can be achieved by using either form of control alone. Other features and capabilities of the invention will also be described. Also in the description to follow, a particular preferred embodiment will be described, that embodiment having various features and capabilities which complement the invention and increase its versatility, though are not essential to the practice of the invention through other embodiments. Accordingly, these aspects are described herein not for the purposes of limitation of the invention, but rather as an illustration of the versatility that can be achieved by use of the present invention.

Figure 1:
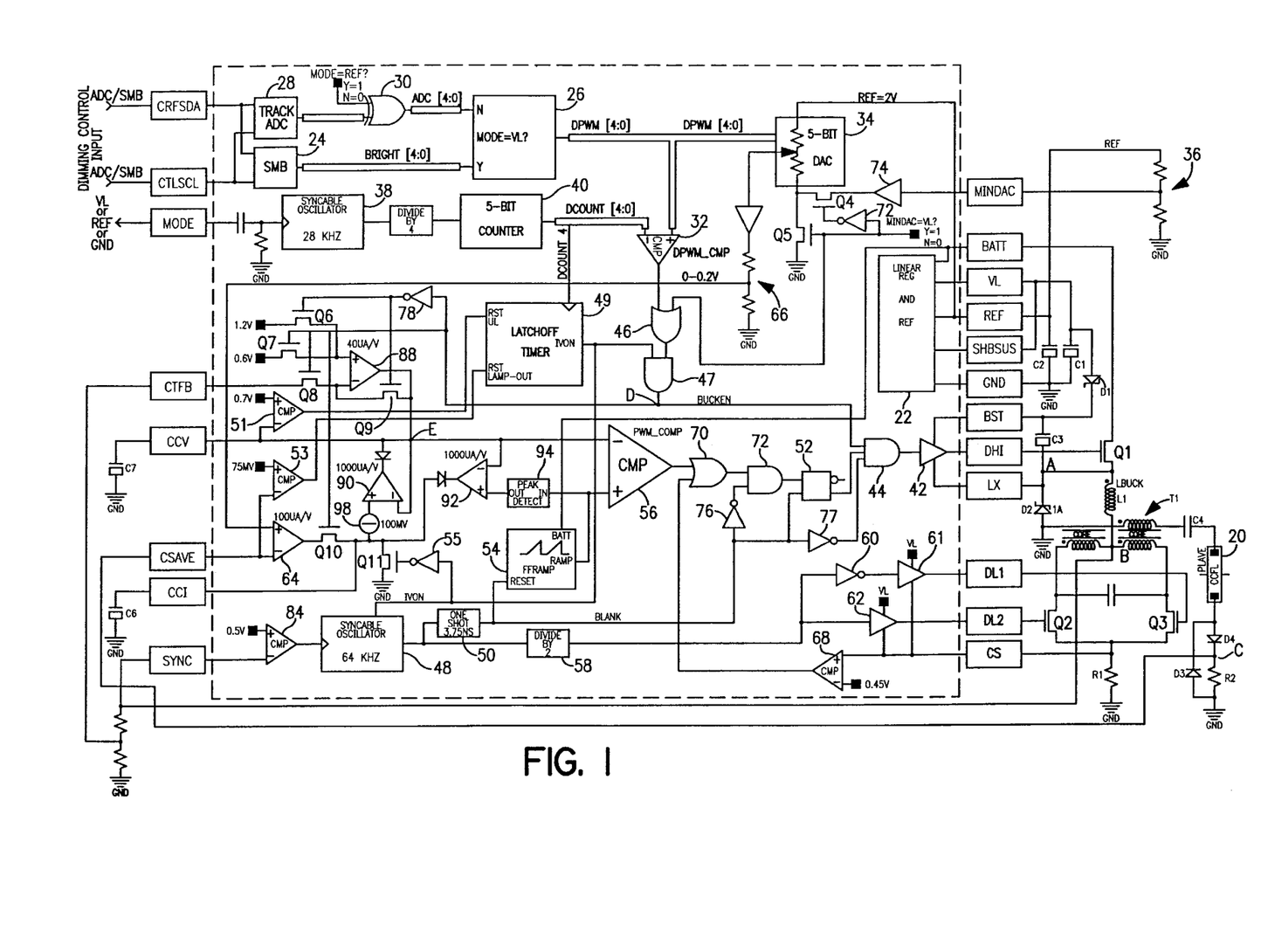
FIG. 1 is a block diagram of a preferred embodiment of the present invention.

Now referring to FIG. 1, a block diagram of a preferred embodiment of a cold cathode fluorescent lamp backlight controller may be seen. In this diagram, the major functional pins of the exemplary embodiment are shown as rectangles with the pin identifications therein. These pins are shown in the Figure as two columns of such pins, the exemplary embodiment being realized in integrated circuit form for those elements of the circuit located between the two columns of pins. Also in the exemplary embodiment, those elements located to the right of the right-hand column of pins are discrete components, the cold cathode fluorescent tube itself being identified as the fluorescent tube 20.

In the diagram of FIG. 1, the average voltage on the MODE pin configures the circuit to allow setting the cold cathode fluorescent lamp brightness in one of three ways. In particular, supply 22, typically powered by a battery connected to the BATT terminal, provides output voltages VL and REF coupled to external noise reducing capacitors $C_1$ and $C_2$, respectively. The cold cathode fluorescent lamp brightness may be set using the SMBus serial interface with MODE=VL, using an analog control voltage where zero means maximum brightness with MODE=REF, or using an analog control voltage where zero means minimum brightness with MODE=GND. To configure the circuit, MODE is connected to either VL, REF or GND through a 10 K resistor. (The actual control lines from the MODE input to the elements controlled by the MODE input are not shown to not obscure the signal paths.) Also, an AC signal can be injected into the MODE pin in order to synchronize the digital output modulator chopping to an external signal, typically the VSYNC of the backlighted LCD panel. With MODE=VL, the CRFSDA pin becomes the System Management Bus (SMBus) serial data input, with the CTLSCL pin becoming the SMBus serial clock input. With MODE=

REF or GND, the CTLSCL pin becomes analog input voltage pin for setting the fluorescent lamp brightness relative to the voltage on the CRFSDA pin. In the case of the SMBus input (MODE=VL), the SMBus interface 24 converts the serial SMBus input to a 5 bit parallel signal which is latched into latch 26. With MODE=REF or GND, the analog input voltage for dimming control is converted to a 5 bit digital signal by the tracking analog-to-digital converter 28, the output of which is provided as one input to XOR gate 30. If MODE=REF, the second input to XOR gate 30 is high or 1, resulting in the output of the XOR gate 30 being the 5 bit complement of the output of the tracking analog-to-digital converter. If, on the other hand, MODE=GND, the second input to the XOR gate 30 will be low or zero, so that the XOR gate 30 will simply pass the 5 bit output of the tracking analog-to-digital converter 28 to the latch 26.

The 5 bit output of latch 26 is coupled to a 5 bit comparator 32 and a five bit digital-to-analog converter 34. The digital-to-analog converter converts the 5 bit value from latch 26 to an analog value. If the input MINDAC=VL, transistor Q5 will be turned on and transistor Q4 will be turned off through inverter 72, so that the analog value will range from REF to GND. If MINDAC≠VL, transistor Q5 will be turned off and transistor Q4 will be turned on through inverter 72, so that the analog voltage will range from REF to some fraction of REF, as divided down by voltage divider 36 and buffered by buffer amplifier 74.

Also in the circuit of the exemplary embodiment of FIG. 1, the output of a 28 kHz oscillator 38 is divided by 4 and then provided to a 5 bit counter 40 to provide a 5 bit count counting from 00000 to 11111 at a 224 Hz rate. When the output of the 5 bit counter 40 is 00000, the output of the five bit latch 26 will be larger, so that at the beginning of the count, the output of the 5 bit comparator 32 will be high, and will remain high until the 5 bit counter counts up to the output of latch 26, after which the output of the comparator 32 will go low and remain low throughout the rest of the count.

The voltage VL is coupled through external diode D1 to the input terminal BST, which in turn is capacitively coupled to another input terminal LX through capacitor C3. The output terminal DHI is coupled to the gate of n-channel transistor Q1, with the drain of transistor Q1 being coupled to the power supply connected to the BATT pin. The source of transistor Q1 is coupled to one end of inductor L1, to ground through diode D2 and to the LX pin of the circuit. The voltage applied to the BST pin provides the gate voltage for transistor Q1 to turn the same on, whereas the voltage applied to the LX pin is merely the low side or source voltage of transistor Q1. When transistor Q1 is off, the voltage on node A will be no higher than one forward conducting diode voltage drop (diode D2) below ground, whereas the voltage applied to the BST pin will be no lower than one forward conducting diode voltage drop (D1) below the voltage VL. Consequently, capacitor C3 will have a charge thereon, the voltage on the BST pin being larger than the voltage on the LX pin by the voltage VL. When transistor Q1 is turned on, node A will be coupled through the transistor to the battery voltage on the BATT pin. This jump in voltage on node A will be coupled through capacitor C3 to pin BST, providing a gate drive for transistor Q1 when the transistor is on that is substantially higher than the battery voltage. In essence, the combination of transistor Q1, inductor L1 and diode D2, together with the control thereof, provide a buck converter or regulator of the general type well known in the regulator or converter art.

The second end of inductor L1, node B, is connected to the center tap of the primary of a step-up transformer generally indicated by the numeral T1. The two ends of the primary are coupled to ground through common source connected n-channel transistors Q2 and Q3 through resistor R1, and to the input pin CS. As shall be subsequently described in greater detail, resistor R1 is a relatively low valued resistor, with the voltage across the resistor indicating the current through transistor Q2, transistor Q3, or both of them, to provide protection against excessive currents in the primary circuit as may be caused by a malfunction of the circuit or the control thereof.

The secondary of the transformer T1 has one end coupled to ground and the other end coupled through capacitor C4 to one end of the cold cathode fluorescent tube 20. The other end of the fluorescent tube 20 is coupled to ground through diode D3, and the series combination of diode D4 and resistor R2. Since the secondary voltage of transformer T1 is an alternating voltage, diode D4 and resistor R2 provide a conduction path through the tube 20 to ground when the secondary voltage is positive, and diode D3 provides a conduction path from ground through tube 20 when the secondary voltage is negative. The voltage across resistor R2, coupled to the input pin CSAV, provides a voltage proportional to the tube current when the secondary voltage of the transformer is positive.

When the input to gate driver amplifier 42 is high, the output of the amplifier on the output pin DHI will go high, turning on transistor Q1 of the buck converter.

This requires that all three inputs to AND gate 44 be high. If MINDAC≠VL, one input to OR gate 46 will be low. The other input to OR gate 46 from comparator 32, as previously described, will be high at the beginning of each 224 Hz cycle, going low when the 5 bit counter 40 has counted up to the binary value stored in register 26. Consequently, assuming the signal IVON is high (to be subsequently described), the low-frequency chopping duty cycle of the buck converter is set responsive to the analog dimming. control input or the digital input on the SMBus, dependent on which control is being used (and the MODE input to XOR gate 30). In particular, the outputs of OR gate 46 and AND gate 47 (the BUCKEN signal) must be high to enable the AND gate 44 to respond to the state of the other two inputs thereto. However if MINDAC=VL, one input to the OR gate 46 will be held high, enabling AND gate 44 to continuously respond to the state of the other two inputs to the AND gate (again assuming the signal IVON is high), irrespective of the state of the output of the comparator 32. This allows the buck converter to be externally controlled to continuously run, limiting. the dimming control to dimming through current limiting, rather than the combination of current limiting and chop-mode dimming.

The 64 kHz oscillator 48 triggers a 375 nanosecond one-shot 50 to set RS flip-flop 52. During the on period of the one-shot, inverter 77 will pull one input to AND gate 44 low, forcing the buck switch Q1 off. The one-shot also provides a reset input to a saw-tooth generator 54 to generate the 64 KHZ saw tooth signal shown. This saw-tooth signal is coupled to the positive input of comparator 56 and to peak detector 94. The 64 kHz signal from oscillator 48 is also divided in half by divider 58 to provide gate drive signals to n-channel transistors Q2 and Q3 on pins DL1 and DL2 through inverter 60 and drive amplifiers 61 and 62. The complementary signals provided by amplifiers 61 and 62 are overlapping complementary signals, so that transistors Q2 and Q3 will not be both off at the same time.

In normal operation, the current through resistor R1 will remain below a predetermined limit, so that the voltage across resistor R1 will be limited, specifically in the embodiment shown, to less than 0.45 volts. Consequently the output of comparator 68 will normally be low, so that OR gate 70 will respond to the state of the other input thereto. In the case of a circuit fault, such as transistor Q2 or Q3 or both being stuck on, the current through resistor R1 may become excessive, with the voltage drop across the resistor exceeding 0.45 volts. Now the output of comparator 68 will go high, causing a high output of OR gate 70. When the output of one-shot 50 is low, inverter 76 will make the second input to AND gate 72 also high, providing a high output of AND gate 72 for reset signal to SR flip-flop 52. This provides a low input to AND gate 44 so that transistor Q1 will be off during this time. When the output of one-shot 50 is high, inverter 77 will provide a low input to AND gate 44 so that transistor Q1 will also be off during this time. Thus the buck converter will be off whenever the current through resistor R1 is above a predetermined current, and will remain off until after the SR flip-flop is set at the end of the next one-shot pulse.

When the output of OR gate 46 and the signal IVON (coupled to one input of AND gate 44) are high, transistors Q7, Q8 and Q10 will be on, and inverter 78 will hold transistors Q6 and Q9 off. Each time one of transistors Q2 and Q3 is turned on and the other transistor is turned off, the voltage at node B will increase and then decay. When the voltage at node B decays below 0.5 volts in the embodiment shown, comparator 84 will provide a positive output, triggering synchronizable oscillator 48, thereby commutating Q2 and Q3 and reversing the current in the primary of T1. When not synchronized by the output of comparator 84, as when the buck converter is off and the current in inductor L1 is low or zero, oscillator 48 will self-oscillate at approximately 64 KHz in the embodiment shown.

The voltage on node B, as divided down by voltage divider 86, is coupled to the CTFB terminal. When the buck enable signal BUCKEN on node D is high, transistors Q7 and Q8 will be on and transistor Q9 will be off. Consequently transconductance amplifier 88 will provide an output current to node E proportional to the difference in the voltages on node B, as divided down by the voltage. divider 86, and 0.6 volts. Capacitor C7 integrates the currents. into and out of node E to provide smoothing for the voltage of node E. Provided that in the preferred embodiment, the voltage CTFB remains below 0.6 volts, as it will unless there is a circuit fault, the output current of transconductance amplifier will be positive, providing a pull-up current to node E.

Also in normal operation, the current flow through fluorescent tube 20 in a first direction will flow though diode D4 and resistor R2, whereas current through the tube in the reverse direction will flow though diode D3. Accordingly, the voltage on node C will approximate that of a half-wave rectified signal. This voltage is applied through the CSAVE terminal to the negative input of transconductance amplifier 64, the other input of which is proportional to the output of the digital-to-analog converter 34 as divided down by voltage divider 66. The output of the transconductance amplifier 64 is coupled through transistor Q10, which is on when the buck-enable signal BUCKEN at node D is high, to an external capacitor C6. The charging and discharging rate of the capacitor by the output of transconductance amplifier 64 is preferably very slow in comparison to the period of the oscillator 48.

The output of the ramp generator 54 provided to the positive input of comparator 56 is also coupled to peak detector 94 which provides an output voltage equal to the peak voltage of the ramp input thereto. Provided the voltage on node E is less than that peak voltage, the output current of transconductance amplifier 92 will be zero. (Transconductance amplifiers 90 and 92 are unidirectional, in that they can only sink current, not source current, as indicated by the diode symbol associated with their outputs. They also have a much higher transconductance than transconductance amplifiers 88 and 64.)

The voltage across resistor R2 is proportional to the current through tube 20, and is fed back through pin CSAVE to the negative input of transconductance amplifier 64. The positive input to the transconductance amplifier is the analog output of the digital-to-analog converter 34, as divided down by divider 66. Consequently, transconductance amplifier 64 provides an. output current (source or sink) proportional to the difference between the output of the digital-to-analog converter and a voltage proportional to tube current. The value of resistor R2, of course, may be selected in accordance with the general current requirements of the specific cold cathode fluorescent lamp 20 being used. Capacitor C6 provides a long integration time period for the output of the transconductance amplifier, transistor Q10 being on when the buck enable signal BUCKEN is high. Transconductance amplifier 90, having a much larger transconductance than transconductance amplifier 88, will sink the current of transconductance amplifier 88 with a low differential voltage across its input. Consequently the voltage on node E will be approximately 100 mv. above the voltage on capacitor C6, the voltage increment provided by the voltage source 98 of the preferred embodiment. The voltage at node E is linearly responsive to the high-frequency duty cycle of the buck switch Q1. The buck switch duty-cycle is linearly responsive to the average voltage at node B and node B is linearly responsive to the transformer secondary voltage. When the transformer secondary voltage increases, the drop across C4 increases, which increases the current in the tube 20. Thus in normal operation, the voltage on node E will be linearly responsive to the average current through the tube 20.

The output of the ramp generator 54 is coupled to the positive input of comparator 56. When the output of one-shot 50 goes high, the ramp generator 54 is reset, having a low voltage during the period of the one-shot and then ramping up to a maximum voltage before one-shot 50 fires again. During the period of operation of one-shot 50, SR flip-flop 74 will be set, providing a high output to AND gate 44. However inverter 77 provides a low input to AND gate 44, holding DHI low and transistor Q1 off. When the output of one-shot 50 goes low again, the output of inverter 76 will go high, providing one high input to AND gate 72. Also the output of inverter 77 will go high, providing one high input to AND gate 44. However, while the output of the ramp generator 54 is relatively low, the voltage on node E will exceed the voltage on the positive input to comparator 56, providing a low input to OR gate 70. Since in normal operation both inputs of OR gate 70 are now low, the output of OR gate 70 to AND gate 72 will be low, providing a low input to the reset input of SR flip-flop 74. This holds the flip-flop set and transistor Q1 on so long as the buck enable signal BUCKEN remains high and the output of AND gate 72 remains low.

When the voltage of ramp generator 54 exceeds the voltage on node E, the output of comparator 56 will go high. This drives the output of OR gate 70 and AND gate 72 high, resetting SR flip-flop 52 to drive the output thereof low, turning off transistor Q1 through AND gate 44 and driver amplifier 42. Thus, the operating cycle of the buck converter is controlled by comparing the average tube current with the output of the digital-to-analog converter 34 as set by the analog or digital control inputs to the circuit.

When the buck enable signal BUCKEN goes low, transistor Q1 is turned off through AND gate 44 and driver amplifier 42. Also, transistors Q7, Q8 and Q10 are turned off and transistors Q6 and Q9 are turned on, so that in the preferred embodiment, transconductance amplifier 88 will hold node E and the voltage on capacitor C7 at 1.2 volts pending the next operating cycle of the buck converter. This causes the Royer oscillator to start the next on-cycle at a very low duty cycle to avoid overshoot on its primary voltage.

From the foregoing description, it may be seen that the control input to this specific embodiment of the present invention disclosed herein may either be an analog signal through the tracking analog-to-digital converter 28, or a digital input such as by way of specific example, an SMBus input. In the case of the analog input, a MODE input voltage may be used to determine whether a low voltage input represents a dim condition or a high a voltage input represents a dim condition through the control of one input to XOR gate 30. Another input voltage, MINDAC, will determine whether the BUCK converter is enabled all the time. (MINDAC=VL), or the BUCK converter is operated in the chop-mode wherein the cold cathode florescent tube is allowed to become extinguished between periods of operation of the buck converter. During the periods of operation of the buck converter, the output of the digital-to-analog converter 34 provides a control to control the switching duty cycle of the buck converter. In that regard, it will be noted that in the preferred embodiment disclosed, the output of the digital-to-analog converter 34 is referenced to ground when the BUCK converter is enabled 100% of the time, though is referenced to the output of voltage divider 36 when the buck converter is in the chop-mode of operation. This assures periodic restarting of the cold cathode fluorescent tube with a short burst of sufficient tube current to provide stable operation of the tube during such on times, thereby providing a greater dimming range than may be provided by merely limiting tube current, or using a fixed current for a chop-mode operation for dimming purposes.

Another feature of the specific embodiment disclosed results from the fact that when the circuit is operating in both chop-mode and tube current limit mode, the dimming control signal, whether analog or digital, is used both to limit the tube current during periods of operation of the buck converter and to limit the chopping duty cycle of operation of the buck converter. Accordingly, the response of the average energy delivered to the tube to the control input is approximately a square law relationship, providing a highly satisfactory approximation of a preferred exponential response.

The circuit of the preferred embodiment also provides certain features to protect the integrated circuit, to protect the tube and to protect other external circuit elements in the event of certain circuit faults. By way of example, if either or both transistors Q2 and Q3 remain permanently on, the voltage across resistor R1 will become excessive, holding transistor Q1 off at all times. Similarly, if the voltage on node B becomes excessive, the voltage applied to the negative input to transconductance amplifier 88 will become higher than 0.6 volts, eliminating the pull up current for node E and actually further sinking the node, again with the result that transistor Q1 will be off for a greater fraction of the time to limit at the voltage on node E to the value set by the feedback loop.

Further safety features are provided through the operation of the latchoff timer 49. In particular, in normal operation of the exemplary embodiment, the voltage across resistor R2 responsive to the current in tube 20 will normally have a peak voltage exceeding 75 millivolts, so that the output of comparator 53 will periodically go high at the frequency of the Royer inverter. This repeatedly pulses the LAMP-OUT reset line RST of the latch-off timer 49 at the Royer inverter frequency, whereby the latchoff timer 49 will remain reset with the negative logic output signal IVON high. Also in normal operation, the voltage CCV will remain above 0.7 volts in the exemplary embodiment, so that the output of comparator 51 will also be high, holding the other reset line to the latchoff timer 49 high. However, if for some reason the cold cathode fluorescent lamp 20 is ever unplugged or otherwise disconnected from the Royer inverter, the high voltage normally provided to the lamp should turn off in accordance with UL requirements. With the lamp unplugged or otherwise disconnected, the voltage drop across resistor R2 will be zero, so that the output of comparator 53 will remain low as a steady state condition, and the LAMP-OUT reset line RST will not periodically reset the latchoff timer. Thus, the latchoff timer 49, being clocked by the most significant bit of the five bit counter 40, will latch off after 2 seconds. This forces the CCI pin low through inverter 55 and transistor Q11, and stops the synchronizable oscillator 48. At the same, the output of the latchoff timer 49 going low effectively disables the AND gate 47, in turn disabling AND gate 44 and holding the buck switch Q1 off.

Comparator 51 is part of buck switch short detection circuitry useful in helping to pass the UL 1950 requirement for single point failures. In the case of the buck switch Q1 shorting, the circuit loses control over the transformer voltage. The controller senses this condition by monitoring the transformer voltage loop error signal CCV. When the transformer voltage is more than a regulated limit, the CCV signal will rail low, causing the output of, comparator 51 to go and remain low. When the output of comparator 51 remains low for more than 250 milliseconds, the latchoff timer 49 will time out, again driving the output signal thereof IVON low. This too forces the CCI pin to rail low, and the Royer inverter to stop commutating. It also forces the BUCK switch drive off by providing one low input to AND gate 47 and thus at least one low input to AND gate 44. In addition, normally the circuitry is fused, so that if the BUCK switch is truly shorted, the fuse will blow because of the low impedance DC path through the shorted BUCK switch, the buck inductor, the transformer primary and one of the inverter switches. In that regard, when the output of the latchoff timer 49 goes low because of the lack of occurrence of at least one of the reset signals for a predetermined period of time, one of the inverter switches Q2 and Q3 will be latched on, though which one will only be determined by the state of the circuitry when the IVON signal goes low.

These two fault detection circuits also protect against some other circuit faults. In particular, any fault that causes a transformer over-voltage for 250 milliseconds will trip the BUCK short fault, whereas any fault that cannot light the cold cathode fluorescent tube for more than 16% of full scale will also be detected.

Thus the exemplary embodiment of the invention is a fully integrated controller optimized to drive cold cathode fluorescent lamps using the industry proven Royer oscillator inverter architecture. The Royer architecture provides near sinusoidal drive waveforms over the entire input range to maximize the life of cold cathode fluorescent lamps. The invention optimizes this architecture to work over a wide input voltage range, achieves high efficiency, and maximizes the dimming range.

The exemplary embodiment monitors and limits the transformer center-tap voltage when required. This ensures minimal voltage stress on the transformer, which increases the operating life of the transformer and eases its design requirements. The exemplary embodiment also provides protection against many other fault conditions including lamp-out and buck short faults.

An exemplary embodiment achieves 50:1 dimming range by simultaneously adjusting lamp current and "chopping" the cold cathode fluorescent lamp on and off using a digitally adjusted pulse width modulation (DPWM) method. DPWM is implemented by pulse width modulating the lamp current at a rate faster than the eye can detect. Cold cathode fluorescent lamp brightness is controlled by an analog voltage or is set with an Intel System Management Bus (SMBus) compatible two-wire interface The exemplary embodiment drives an external high side N-channel power MOSFET and two low side N-channel power MOSFETs, all synchronized to the Royer oscillator The exemplary embodiment regulates the brightness of a cold cathode florescent lamp in 3 possible ways,
1) Linearly controlling the lamp current
2) Digitally pulse width modulating (or chopping) the lamp current (DPWM)
3). Using both methods simultaneously for the widest dimming range.

The exemplary embodiment includes a 5.3V linear regulator to power most of the internal circuitry, drivers for the buck and Royer switches, and the synchronizable DPWM oscillator. The exemplary embodiment is very flexible and includes a variety of operating modes, an analog interface, an SMBus interface, a shutdown mode, lamp-out detection, and buck-switch short detection.

The exemplary embodiment uses two control loops. The current control. loop regulates the average lamp current. The voltage control loop limits the maximum average primary-side transformer voltage. The voltage control loop is active during the beginning of DPWM on-cycles and in some fault conditions. Limiting the transformer primary allows for a lower transformer secondary voltage rating that can increase reliability and decrease cost of the transformer. The voltage control loop acts to limit the transformer voltage anytime the current control loop attempts to steer the transformer voltage above its limit as set by the feedback voltage on CTFB.

The voltage control loop uses a transconductance amplifier to create an error current based upon the voltage between CTFB and the internal reference level (60.0 mV typ). The error current is then used to charge and discharge the capacitor connected to CCV to create an error voltage. The current control loop produces a similar signal based upon the voltage between CSAVE and its internal reference level. This error voltage is the voltage on CCI. The lower of the voltages on CCI and CCV is used with the buck regulator's pulse width modulator oscillator to set the buck regulator's duty cycle.

During DPWM, the two control loops work together to limit the transformer voltage and to allow wide dimming range with good line-rejection. During the DPWM off-cycle, the voltage on CCV is set to 1.2V and the voltage on CCI is tri-stated in the exemplary embodiment. The voltage on CCV is set to 1.2V to create soft-start at the beginning of each DPWM on-cycle in order to avoid overshoot on the transformer primary. The voltage on CCI is tri-stated to keep the voltage on CCI from changing during the off-cycles. This allows the current control loop to regulate the average lamp current only during DPWM on-cycles and not the overall average lamp current.

Upon power-up, the voltage on CCI slowly rises, increasing the duty cycle, which provides soft-start. During this time, the voltage on CCV, which is the faster control loop, is limited to 150 mV above the voltage on CCI. Once the secondary voltage reaches the strike voltage, the lamp current begins to increase. When the lamp current reaches the regulation point, the voltage on CCI reaches steady state. With MINDAC=VL (DPWM disabled) the current control loop remains in control and regulates the lamp current.

With MINDAC between REF and GND, DPWM is enabled and the exemplary embodiment begins pulsing the lamp current. During the on-cycle, the voltage on CCV is at 150 mV above the voltage on CCI. At the end of the on-cycle, the voltage on CCV is forced down to 1.2V to provide soft-start at the beginning of the next on-cycle. Also at the end of the on-cycle, the voltage on CCI retains its value until the beginning of the next on-cycle. At the beginning of the next on-cycle, the voltage on CCV slowly increases which increases the buck regulator's duty cycle and provides soft start to the Royer Oscillator. When the voltage CCV crosses over the voltage CCI, the current control loop regains control and regulates the lamp current. The voltage on CCV is limited to 150 mV above the voltage on CCI for the remainder of the on-cycle.

In a lamp-out condition $V_{CCI}$ increases the primary voltage in an attempt to maintain lamp current regulation. As the voltage on CCI rises, the voltage on CCV rises with it until the primary voltage reaches its set limit point. At this point, the voltage on CCV stops rising and limits the primary voltage by limiting the duty cycle. Because the voltage on CCV is limited to 150 mV above the voltage on CCI, the voltage control loop is able to quickly limit the primary voltage. Without this clamping feature on the voltage CCV, the transformer voltage would overshoot to dangerous levels because the voltage on CCV would take more time to slew down from its supply rail. Once the exemplary embodiment senses less than ⅙ the full scale current through the lamp for 2 seconds, it shuts down the Royer Oscillator.

Both control loops are influenced by the exemplary embodiment's feed-forward control circuitry. Feed-forward control instantly adjusts the buck regulator's duty cycle when it detects a change in input voltage. This provides immunity to changes in input voltage at all brightness levels. This feature makes compensation over wide input ranges easier, makes start-up transients less dependant on input voltage, and improves line regulation for short DPWM on times.

The exemplary embodiment feed forward control is implemented by varying the amplitude of the buck switch's pulse width modulator ramp amplitude. This has the effect of varying the duty cycle as a function of input voltage while maintaining the same voltages on CCV and CCI. Conversely the battery voltage BATT feed-forward has the effect of not requiring changes in error-signal voltages CCI and CCV to respond to changes in the battery voltage BATT. Since the capacitors only need to change their voltage minimally to respond to changes in the battery voltage BATT, the controller's response is essentially instantaneous.

The exemplary embodiment is designed to maintain tight control of the transformer primary under all transient conditions. This includes transients from dropout, where the battery voltage BATT is so low that the controller loses regulation and reaches maximum duty cycle. Backlight designs will want to choose circuit component values to minimize the transformer turns ratio in order to minimize primary-side currents and $I^2R$ losses. In order to achieve this, it is desirable to allow the circuit to operate in dropout at extremely low battery voltages where the backlight's performance is secondary. All backlight circuit designs can undergo a transient over-voltage condition when the laptop is plugged into the AC adapter and the battery voltage BATT suddenly increases. The exemplary embodiment contains a unique clamp circuit on the voltage on CCI that together with the feedforward circuitry ensures that there is not a transient transformer overvoltage when leaving dropout.

The clamp circuit limits the voltage on CCI to the peaks of the buck switch's pulse width modulator ramp generator. As the circuit reaches dropout, the voltage on CCI approaches the peaks of the pulse width modulator ramp generator in order to reach maximum duty cycle. If the voltage on BATT decreases further, the control loop looses regulation and the voltage on CCI tries to reach its positive supply rail. The clamp circuit on the voltage on CCI keeps this from happening and the voltage on CCI rides just above the peaks of the pulse width modulator ramp. As the voltage on BATT decreases further, the feedforward pulse width modulator ramp generator looses amplitude and the clamp drags the voltage on CCI down with it to a voltage below where the voltage on CCI would have been if the circuit was not in dropout. When the voltage on BATT is suddenly increased out of dropout, the voltage on CCI is still low and maintains the drive on the transformer at the old dropout level. The circuit then slowly corrects and increases the voltage on CCI to bring the circuit back into regulation.

The buck regulator uses the signals from the pulse width modulator comparator, the current limit detection on CS, and DPWM signals to control the high side MOSFET duty cycle. The regulator uses voltage-mode pulse width modulator control and is synchronized to the Royer oscillator. A falling edge on SYNC turns on the high side MOSFET after a 375 ns minimum off-time delay. The pulse width modulator comparator or the CS current limit ends the on-cycle.

Thus the brightness is controlled by either the Analog Interface or the SMBus Interface. The brightness of the Cold cathode fluorescent lamp is adjusted in the following three ways:

1) Lamp Current Control, where the magnitude of the average lamp current is adjusted
2) DPWM Control, where the average lamp current is pulsed to the lamp with a variable duty cycle
3) and the combination of the first two methods.

In each of the three methods, a 5-bit brightness code is generated from the selected interface and is used to set the lamp current and/or DPWM duty cycle.

The exemplary embodiment's analog interface uses an internal ADC with 1-bit hysteresis to generate the brightness code used to dim the lamp. CTLSCL is the ADC's control input and CRFSDA is its reference voltage. The ADC can operate in either positive scale ADC mode or negative scale ADC mode. In positive scale ADC mode, the brightness code increases from 0 to 31 as the voltage on CRFSDA increases from 0 to its upper limit. In negative scale mode, the brightness scale decreases from 31 to 0 as the voltage on CRFSDA increases from 0 to its upper limit. The analog interface's internal ADC uses 1-bit hysteresis to keep the lamp from flickering between two codes. The positive threshold for the voltage on CTLSCL is the voltage required to transition the brightness code as VCTL increases.

MODE has two functions, one is to select the Interface mode and the other is to synchronize the DPWM "chopping" frequency to an external signal to prevent unwanted effects in the display screen. To synchronize the DPWM frequency, connect MODE to VL, REF, or GND through a 10 kΩ resistor. Then connect a capacitor from an AC signal source to MODE. The synchronization range in the exemplary embodiment is from 32 KHz to 100 KHz which corresponds to a DPWM frequency range of 250 Hz to 781 Hz (128 MODE pulses per DPWM cycle). High DPWM frequencies limit the dimming range.

The exemplary embodiment directly drives the two external MOSFETs used in the Royer Oscillator. This has many advantages over the traditional method that uses bipolar switching and an extra winding on the transformer. Directly driving the MOSFET eliminates the need for an extra winding on the transformer, which reduces cost and minimizes the size of the transformer. Also driving the switches directly improves commutation efficiency and commutation timing. Using MOSFETs for the switches typically improves overall inverter efficiency due to lower switch drops.

The Royer topology works as a Zero Voltage Crossing (ZVC) detector and switches currents between the two sections of the transformer primary windings. The two windings work alternatively generating each a half wave that is transferred to the secondary to produce the full wave sinusoidal lamp voltage and current. The exemplary embodiment detects the zero crossing through the SYNC pin; the threshold is set at 500 mV and has a typical delay of 50 ns. The active switching forces commutation very close to the ZVC point and has better performance than the traditional winding based ZVC switchover. The resistor divider can be used to force commutation as close to the zero crossing point as possible.

The exemplary embodiment includes a Power-on Reset and an undervoltage lockout feature. The power on reset resets all internal registers such as DAC output, fault conditions, and all SMBus registers. Power on reset occurs when VL is below 1.5V. The undervoltage lockout threshold occurs when VL is below 4.2V (Typ) and disables the buck switch driver.

When the exemplary embodiment is placed in shutdown, all functions of the IC are turned off except for the 5V linear regulator that powers all internal registers and the SMBus interface. The SMBus interface is accessible in shutdown. In shutdown the linear regulator output voltage drops to about 4.5V and the supply current is minimal as required to maintain all internal register states. While in shutdown, lamp out detection and buck switch short circuit detection latches are reset. The device can be placed into shutdown by either writing to the MODE register or with SMBSUS.

For safety, during a lamp-out condition, the exemplary embodiment limits the maximum average primary-side transformer voltage and shuts down the lamp after 2 seconds. The lamp-out detection circuitry monitors the voltage on CSAVE and shuts down the lamp if the voltage does not exceed 75 mV (typ) within 2 seconds.

When the Buck switch (Q1) fails short there is no voltage limiting on the transformer and the input forces excessive voltage on the transformer secondary. This increases the circuit's demand for current, but may not be enough to blow the fuse. With the buck switch shorted, the center tap rises above its regulation point which causes the amplifier's output on CCV to go low. In order to detect this, the exemplary embodiment checks that the voltage on CCV is below 1V at the end of every DPWM period. If this condition persists for over 250 ms (or 64 DPWM pulses), the inverter switch commutation is stopped with either DL1 or DL2 on. With the buck switch is shorted, this will cause a short circuit with enough current to blow the fuse. If the buck switch is not shorted, then the inverter simply latches off as in a lamp-out condition.

It should be noted that the preferred embodiment of the present invention disclosed herein has a number of features useful, though not essential to the practice of the invention. In its simplest form, one aspect of the present invention is the combination of current limit control and chop-mode operation of a cold cathode fluorescent tube, allowing a greater dimming range without flickering of a cold cathode fluorescent tube than can be achieved with current limit or chop-mode operation alone. Thus, while the present invention had been disclosed and described with respect to a specific preferred embodiment, it will be understood by those skilled in the art that the preferred embodiment includes features and functions not essential to the practice of invention and that various changes in form and detail may be made therein without departing from the spirit and scope of the invention.

What is claimed is:

1. A cold cathode fluorescent lamp controller comprising:
   a Royer inverter, including a transformer having a center tapped primary winding and a secondary winding;
   a buck converter coupled to the primary winding of the transformer;
   a current control circuit coupled to the buck converter for controlling the duty cycle of the buck converter to control the current through a cold cathode fluorescent lamp coupled to an output of the Royer inverter responsive to a current control signal; and,
   a chop mode control circuit coupled to the buck converter for chopping a cold cathode fluorescent lamp coupled to the output of the Royer inverter on and off responsive to a chop mode control signal.

2. The cold cathode fluorescent lamp controller of claim 1 wherein the current control signal and the chop mode control signal are derived from a common cold cathode fluorescent lamp control signal.

3. The cold cathode fluorescent lamp controller of claim 1 further comprised of a voltage control circuit coupled to the center tap of the transformer, the voltage control circuit limiting the duty cycle of the buck converter responsive to a predetermined voltage on the center tap of the transformer.

4. The cold cathode fluorescent lamp controller of claim 3 wherein an error signal in the voltage control circuit is clamped to an error signal in the current control circuit to provide quick response when changing from current control to voltage control.

5. The cold cathode fluorescent lamp controller of claim 2 wherein the common cold cathode fluorescent lamp control signal is a digital control signal.

6. The cold cathode fluorescent lamp controller of claim 2 wherein the common cold cathode fluorescent lamp control signal is an analog control signal.

7. The cold cathode fluorescent lamp controller of claim 2 wherein the common cold cathode fluorescent lamp control signal is user selectable between a digital control signal or an analog control signal.

8. The cold cathode fluorescent lamp controller of claim 7 wherein the analog control signal is user selectable between an analog control signal providing increased cold cathode fluorescent lamp brightness with an increased analog control signal, and increased dimming of a cold cathode fluorescent lamp brightness with an increased analog control signal.

9. The cold cathode fluorescent lamp controller of claim 1 further comprising a lamp out circuit sensing the absence of a lamp to turn the buck converter off.

10. The cold cathode fluorescent lamp controller of claim 1 further comprising buck converter fault sensing circuitry to limit the duty cycle of the buck converter responsive to excess currents in the buck converter and Royer inverter.

11. The cold cathode fluorescent lamp controller of claim 1 further comprised of a voltage control circuit to providing a soft start at each startup of the buck converter.

12. The cold cathode fluorescent lamp controller of claim 1 further comprising a feed forward of the input voltage to provide an immediate adjustment to the buck converter duty cycle to compensate for the change in the input voltage.

13. The cold cathode fluorescent lamp controller of claim 1 further comprised of a clamp circuit to provide a quick recovery from dropout.

14. The cold cathode fluorescent lamp controller of claim 1 further comprising buck switch short detection circuitry stopping the commutation of the Royer Inverter responsive to a transformer voltage loop error signal indicative of a transformer voltage being more than a regulated limit.

15. A cold cathode fluorescent lamp controller comprising:
   a DC to AC converter, including a transformer having a primary winding and a secondary winding;
   a current control circuit coupled to the converter for controlling a duty cycle of the converter to control a cold cathode fluorescent lamp current output of the converter responsive to a current control signal; and
   a voltage control circuit coupled to the primary winding of the converter for providing AC voltage limiting to the primary winding of the converter by limiting the duty cycle of the converter, wherein the converter operates with a duty cycle to control the cold cathode fluorescent lamp current output of the converter responsive to the current control signal or to maintain the AC voltage of the primary winding of the converter at the AC voltage limit, whichever duty cycle is less.

16. The cold cathode fluorescent lamp controller of claim 15 wherein a voltage control loop error signal is clamped to a current control loop error signal to provide quick response when changing from current control to voltage control.

17. The cold cathode fluorescent lamp controller of claim 15 further comprising a feed forward of the input voltage to provide an immediate adjustment to the converter duty cycle to compensate for the change in an input voltage.

18. The cold cathode fluorescent lamp controller of claim 15 wherein the DC to AC converter comprises a buck converter and a Royer inverter.

19. The cold cathode fluorescent lamp controller of claim 18 further comprising buck switch short detection circuitry stopping the commutation of the buck converter responsive to a transformer voltage loop error signal indicative of a transformer voltage being more than a regulated limit.

20. The cold cathode fluorescent lamp controller of claim 18 further comprising a feed forward of the input voltage to provide an immediate adjustment to the converter duty cycle to compensate for the change in an input voltage.

21. The cold cathode fluorescent lamp controller of claim 20 further comprising a buck converter chop mode controlling circuit coupled to the buck converter for controlling chop mode operation of the buck converter responsive to a buck converter chop mode control signal.

22. The cold cathode fluorescent lamp controller of claim 20 further comprised of a clamp circuit to provide a quick recovery from dropout.

23. The cold cathode fluorescent lamp controller of claim 15 further comprising a chop mode controlling circuit coupled to the DC to AC converter for controlling chop mode operation of the DC to AC converter responsive to a chop mode control signal.

24. The cold cathode fluorescent lamp controller of claim 23, wherein the voltage control circuit further a soft start at the beginning of each chop mode converter cycle.

25. The cold cathode fluorescent lamp controller of claim 15 further comprising a lamp out circuit sensing the absence of a lamp to turn the DC to AC converter off.

26. The cold cathode fluorescent lamp controller of claim 15 wherein the current control signal is a digital control signal.

27. The cold cathode fluorescent lamp controller of claim 15 wherein the current control signal is an analog control signal.

28. The cold cathode fluorescent lamp controller of claim 15 wherein the common lamp control signal is user selectable between a digital control signal or an analog control signal.

29. The cold cathode fluorescent lamp controller of claim 27 wherein the analog control signal is user selectable between a analog control signal providing increased lamp brightness with an increased analog control signal, and increased dimming of a lamp brightness with an increased analog control signal.

30. A lamp controller comprising:
an inverter, including a transformer having a primary winding and a secondary winding;
a buck converter coupled to the primary winding of the transformer;
a current control circuit coupled to the buck converter for controlling the duty cycle of the buck converter to control the current through a lamp coupled to an output of the inverter responsive to a current control signal; and,
a buck converter chop mode controlling circuit coupled to the buck converter for controlling chop mode operation of the buck converter responsive to a buck converter chop mode control signal.

31. The cold cathode fluorescent lamp controller of claim 18 further comprising DC to AC converter fault sensing circuitry to limit the duty cycle of the buck converter responsive to excess currents in the DC to AC converter.

32. A lamp controller comprising:
a Royer inverter, including a transformer having a center tapped primary winding and a secondary winding;
a buck converter coupled to the primary winding of the transformer;
a current control circuit coupled to the buck converter for controlling the duty cycle of the buck converter to control the current through a lamp coupled to an output of the Royer inverter responsive to a current control signal; and,
a chop mode control circuit coupled to the buck converter for chopping the lamp current on and off responsive to a chop mode control signal.

33. A cold cathode fluorescent lamp controller comprising:
an inverter;
a buck converter coupled to an input of the inverter;
a current control circuit coupled to the buck converter for controlling the duty cycle of the buck converter to control the current through a cold cathode fluorescent lamp coupled to an output of the inverter responsive to a current control signal; and,
a buck converter chop mode controlling circuit coupled to the buck converter for controlling chop mode operation of the buck converter responsive to a buck converter chop mode control signal.

34. The cold cathode fluorescent lamp controller of claim 33 wherein the current control signal and the buck converter chop mode control signal are derived from a common cold cathode fluorescent lamp control signal.

35. The cold cathode fluorescent lamp controller of claim 33 wherein a cold cathode fluorescent lamp is coupled to an output of the inverter through a transformer, and further comprised of a voltage control circuit coupled to the transformer, the voltage control circuit limiting the duty cycle of the buck converter responsive to a predetermined voltage on the primary of the transformer.

36. The cold cathode fluorescent lamp controller of claim 35 wherein an error signal in the voltage control loop is clamped to an error signal in the current control circuit to provide quick response when changing from current control to voltage control.

37. The cold cathode fluorescent lamp controller of claim 34 wherein the common cold cathode fluorescent lamp control signal is a digital control signal.

38. The cold cathode fluorescent lamp controller of claim 34 wherein the common cold cathode fluorescent lamp control signal is an analog control signal.

39. The cold cathode fluorescent lamp controller of claim 34 wherein the common cold cathode fluorescent lamp control signal is user selectable between a digital control signal or an analog control signal.

40. The cold cathode fluorescent lamp controller of claim 39 wherein the analog control signal is user selectable between an analog control signal providing increased cold cathode fluorescent lamp brightness with an increased analog control signal, and increased dimming of a cold cathode fluorescent lamp brightness with an increased analog control signal.

41. The cold cathode fluorescent lamp controller of claim 33 further comprising a lamp out circuit sensing the absence of a lamp to turn the buck converter off.

42. The cold cathode fluorescent lamp controller of claim 33 further comprising buck converter fault sensing circuitry to limit the duty cycle of the buck converter responsive to excess currents in the buck converter and inverter.

43. The cold cathode fluorescent lamp controller of claim 33 further comprised of a voltage control circuit to providing a soft start at each startup of the buck converter.

44. The cold cathode fluorescent lamp controller of claim 33 further comprising a feed forward of the input voltage to provide an immediate adjustment to the buck converter duty cycle to compensate for the change in the input voltage.

45. The cold cathode fluorescent lamp controller of claim 33 further comprised of a clamp circuit to provide a quick recovery from dropout.

46. The cold cathode fluorescent lamp controller of claim 33 further comprising buck switch short detection circuitry stopping the commutation of the inverter responsive to a transformer voltage loop error signal indicative of a transformer voltage being more than a regulated limit.

* * * * *